United States Patent

Ito et al.

Patent Number: 6,035,988
Date of Patent: Mar. 14, 2000

[54] FOUR-WHEEL DRIVE CONTROL SYSTEM

[75] Inventors: Kenichiro Ito, Iwata-gun; Makoto Yasui; Shiro Goto, both of Iwata, all of Japan

[73] Assignee: NTN Corporation, Osaka, Japan

[21] Appl. No.: 09/058,849

[22] Filed: Apr. 13, 1998

[30] Foreign Application Priority Data

Nov. 28, 1997 [JP] Japan .................................. 9-328349
Feb. 18, 1998 [JP] Japan .................................. 10-036179

[51] Int. Cl.[7] .................................................. B60K 23/08
[52] U.S. Cl. ........................ 192/82 T; 475/161; 180/247
[58] Field of Search .................... 180/247, 248, 180/249; 477/98, 174; 192/35, 38, 69.42, 82 T; 475/117, 161

[56] References Cited

U.S. PATENT DOCUMENTS

4,784,236  11/1988  Bausch et al. ................... 475/117 X
5,033,575   7/1991  Takeshita et al. ................ 180/247 X
5,105,900   4/1992  Adler et al. ....................... 180/247
5,803,197   9/1998  Hara et al. ........................ 180/248

*Primary Examiner*—Sherry L. Estremsky
*Attorney, Agent, or Firm*—Wenderoth, Lind & Ponack, L.L.P.

[57] ABSTRACT

A control system for a 4WD vehicle has a rotation transmission device which can prevent a two-way clutch of the rotation transmission device from vibrating by repeatedly locking and unlocking when the vehicle is started in a cold environment. The rotation transmission device is mounted in the transfer. The transfer is provided with a temperature sensor for measuring the temperature of oil in the transfer. If the oil temperature as measured by the temperature sensor is below a predetermined value when the vehicle is started with the drive mode set at the 2WD position, the hub clutches are engaged to reduce the idling speed of the two-way clutch and thus to prevent the two-way clutch from locking.

6 Claims, 7 Drawing Sheets

T: Transfer temperature

Tc: Preset temperature value

H: Hysteresis temperature preset value

FOUR-WHEEL DRIVE CONTROL SYSTEM

BACKGROUND OF THE INVENTION

This invention relates to a four-wheel drive control system including a rotation transmission device mounted on the power train of a four-wheel drive vehicle for selective transmission and non-transmission of driving force, and capable of maintaining the function of the vehicle immediately after it is started in a cold environment.

If a 4-wheel drive vehicle turns a tight corner with all the wheels drivingly coupled to the engine, the vehicle will undergo what is known as the "tight-corner braking" effect. To prevent this, the present applicant proposed a rotation transmission device comprising a roller type two-way clutch and a current control means in Japanese patent applications 8-172598 and 9-28001.

Figure 5:
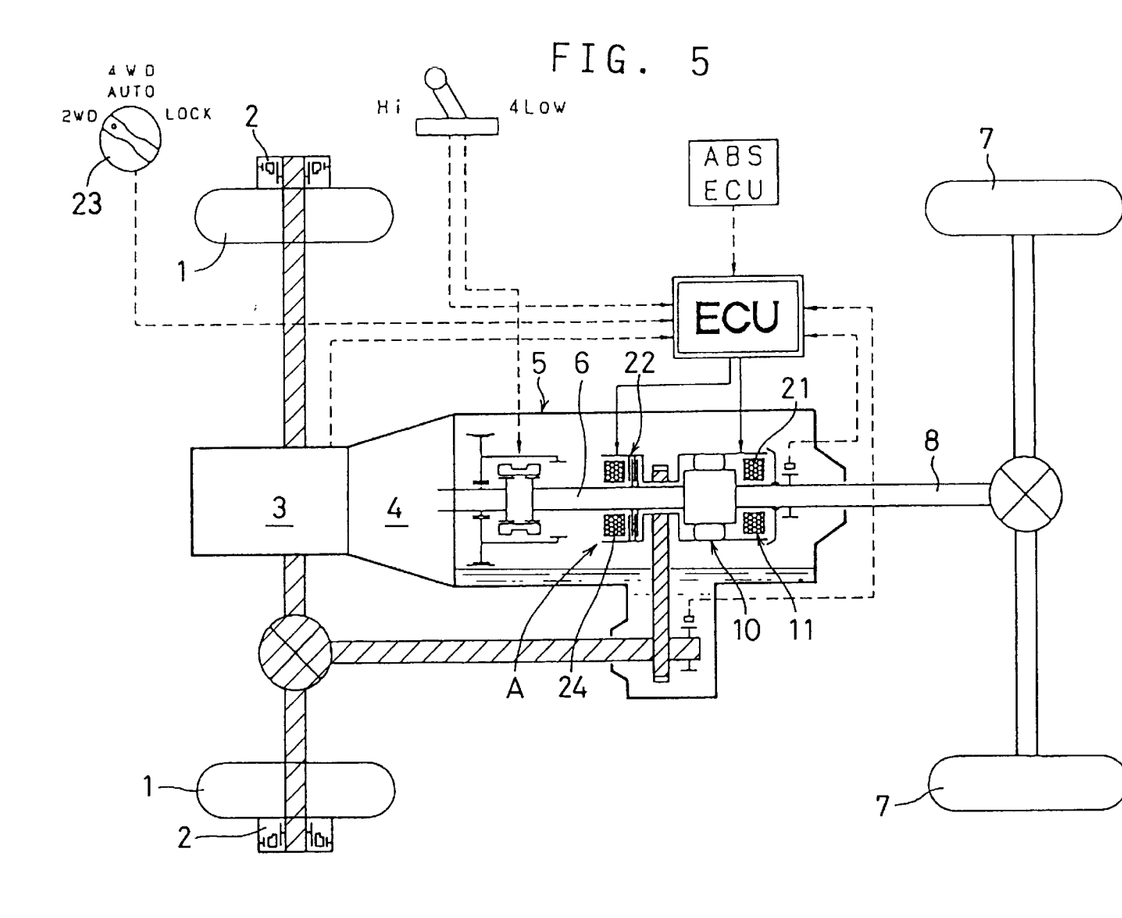
FIG. 5 is a plan view of the power train of a 4WD on which is mounted a rotation transmission device.
Figure 6:
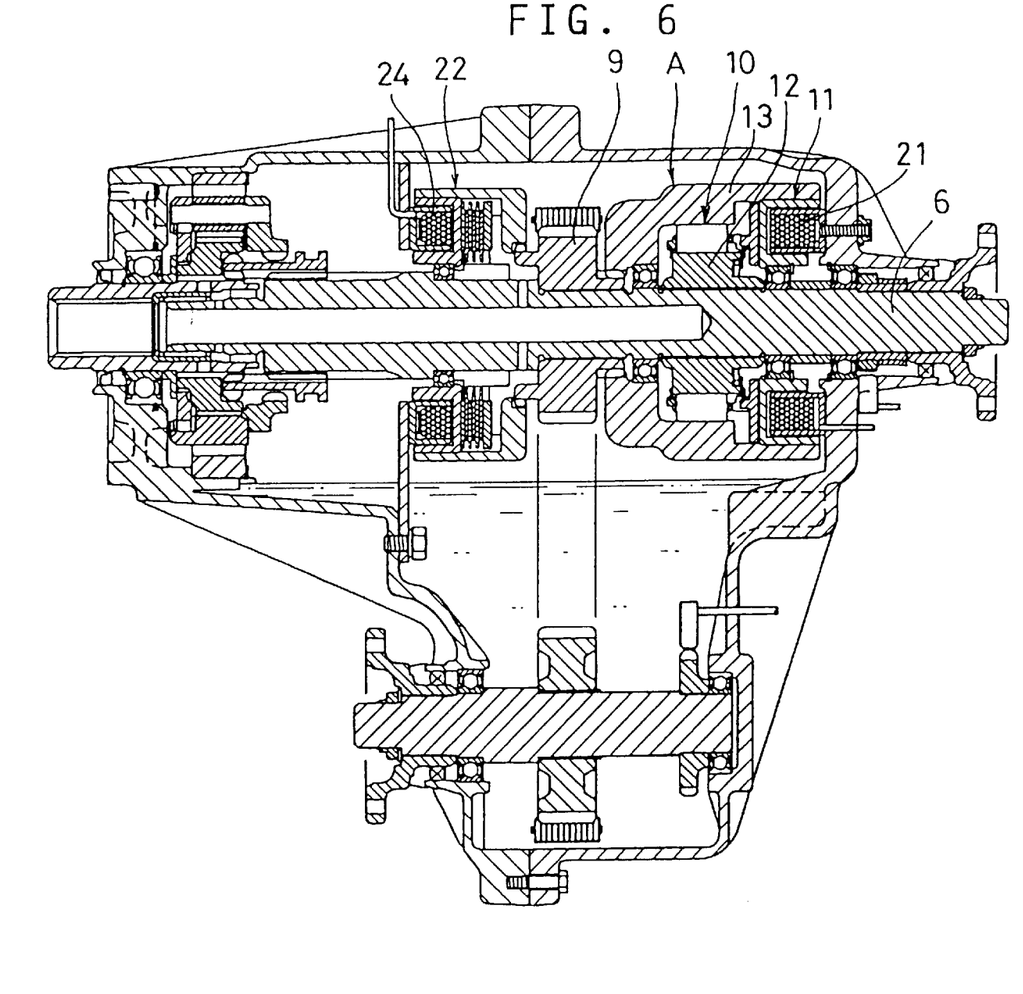
FIG. 6 is a sectional view of a transfer in which is mounted a rotation transmission device.

This rotation transmission device A, shown in FIGS. 5 and 6, is mounted in a transfer 5 of an FR-based 4WD having hub clutches 2 mounted between the front wheel axle and front wheels 1. The output of the transmission 4 coupled to the engine 3 is always transmitted to the rear propeller shaft 8 leading to the rear wheels 7 through an input shaft 6 of the rotation transmission device A. The device A comprises the input shaft 6, a chain sprocket 9 coaxially and relatively rotatably mounted on the input shaft 6, a synchronizer 22 for synchronizing the input shaft 6 and the sprocket 9, a two-way clutch 10 with engaging elements or rollers for coupling and uncoupling the sprocket 9 and the input shaft 6, and a current control means or electromagnetic clutch 11 for locking and unlocking the two-way clutch 10. This 4WD has a 4WD control mode in addition to the drive modes available in a typical conventional part-time 4WD (i.e. 2WD, 4WD-Hi and 4WD-lo).

Figure 7A:
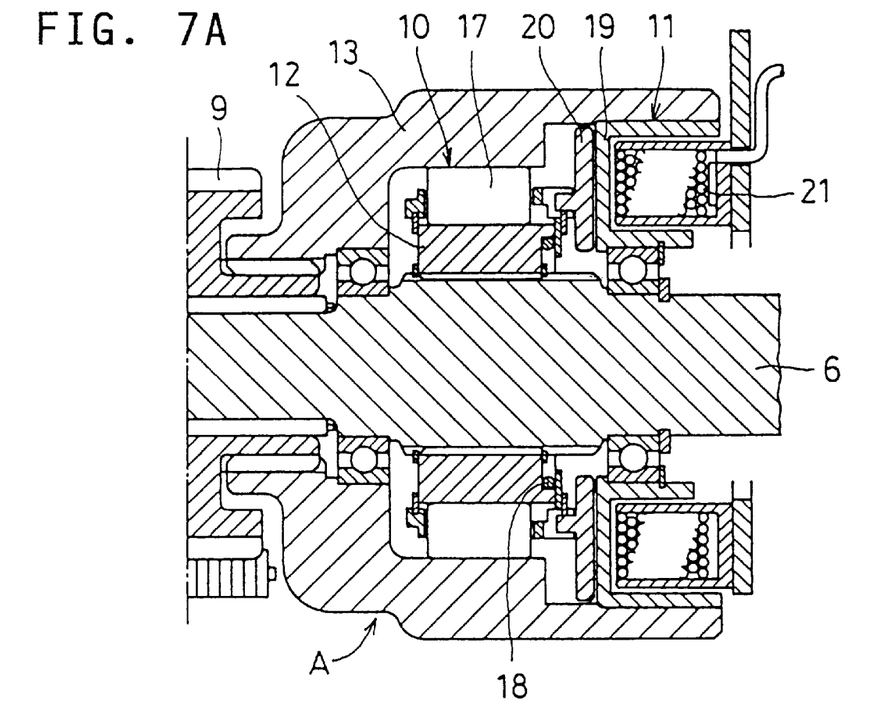
FIGS. 7A and 7B are vertical sectional views of a rotation transmission device.
Figure 7B:
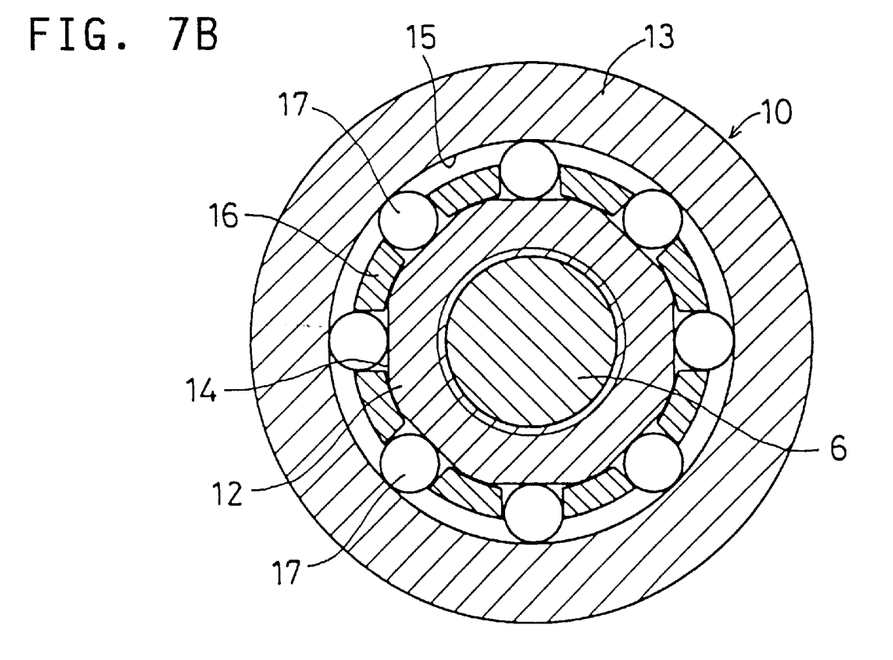

FIGS. 7A and 7B show the two-way clutch 10 and the magnetic clutch 11 of the rotation transmission device A. The two-way clutch 10 includes an inner member 12 and an outer ring 13 coaxially and rotatably mounted around the inner member 12 through bearings. One of the inner member 12 and the outer ring 13 is formed with a plurality of cam faces 14, and the other with a cylindrical face 15 opposite the cam faces 14 to define wedge spaces between the faces 14 and 15. A retainer 16 is received in the wedge spaces. The retainer 16 is formed with a plurality of pockets in which are received rollers 17 as engaging elements. A switch spring 18 engages at one end thereof the retainer 16 and at the other end the inner member 12 or the outer ring 13 formed with the cam faces 14 to bias the retainer 16 toward a neutral position where the rollers 17 do not engage the cylindrical face 15 and the cam faces 14 simultaneously.

The electromagnetic clutch 11 as a current control means for locking and unlocking the two-way clutch 10 comprises a friction flange 19 fixed to the outer ring 13 or the inner member 12, an armature 20 axially slidably but relatively nonrotatably coupled to the retainer 16 and provided in juxtaposition with the friction flange 19 with a gap therebetween, and an electromagnetic coil 21 for magnetically pressing the friction flange 19 and the armature 20 against each other. By selectively activating and deactivating the coil 21, the rollers 17 are engaged and disengaged.

A 4WD performs best in snowy, cold environments. Immediately after it is started in a cold condition, oil in the transfer is also cold and thus high in viscosity.

The 4WD shown has a mode changeover switch 23. When it is traveling with the switch 23 in the 2WD position, the hub clutches 2 and the two-way clutch 10 are disengaged, so that the front power train stops.

Immediately after the 4WD is started in a cold environment, oil in the transfer is cold and high in viscosity. Thus, even during the 2WD mode, in which the two-way clutch 10 is supposed to be kept unlocked with the inner member 12 rotating relative to the stationary outer ring 13, the rollers 17 may get locked by the dragging resistance of the oil in the transfer.

When the rollers 17 lock, the outer ring 13 begins to rotate together with the inner member 12. In this state, no large dragging force acts on the rollers 17, so that the rollers return to the neutral position, allowing the outer ring 13 to slow down. This causes the rollers 17 to get locked again. While the oil temperature is low, this cycle is repeated, producing vibrations.

An object of this invention is to provide a control system for a 4WD vehicle having a rotation transmission device which can prevent the two-way clutch of the rotation transmission device from vibrating by repeatedly locking and unlocking when the vehicle is started in a cold environment.

SUMMARY OF THE INVENTION

According to this invention, there is provided a four-wheel drive system comprising a rotation transmission device mounted in a transfer in an FR-based four-wheel drive vehicle. The rotation transmission device is capable of directly delivering the output from a transmission to a rear propeller shaft through an input shaft mounted in the transfer and distributing the output from the transmission to a front propeller shaft. The rotation transmission device comprises a two-way clutch including engaging elements, and a current control means for selectively locking and unlocking the two-way clutch, thereby changing over the vehicle drive mode between two-wheel and four-wheel drive modes, wherein the current control means are controlled based on a signal from a temperature sensor for detecting the temperature of lubricating oil in the transfer.

The oil temperature signal from the temperature sensor may be transmitted to a controller, which controls the current supplied to the current control means according to the signal from the temperature sensor.

Other features and objects of the present invention will become apparent from the following description made with reference to the accompanying drawings, in which:

DETAILED DESCRIPTION OF THE PREFERRED EMBODIMENT

Embodiments of this invention are described with reference to the drawings.

Figure 1:
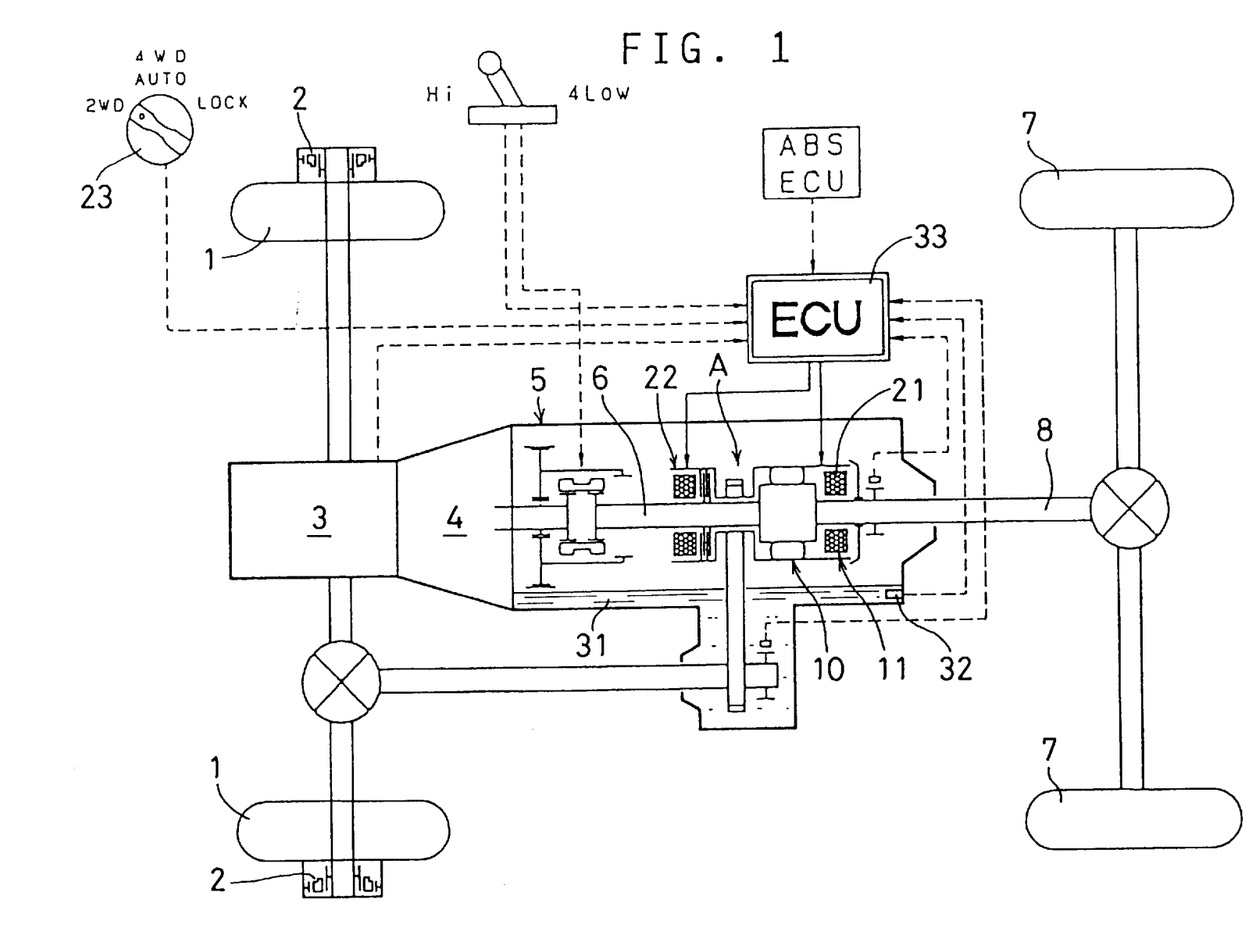
FIG. 1 is a plan view of the power train of a 4WD car on which is mounted a control system embodying the present invention.
Figure 2:
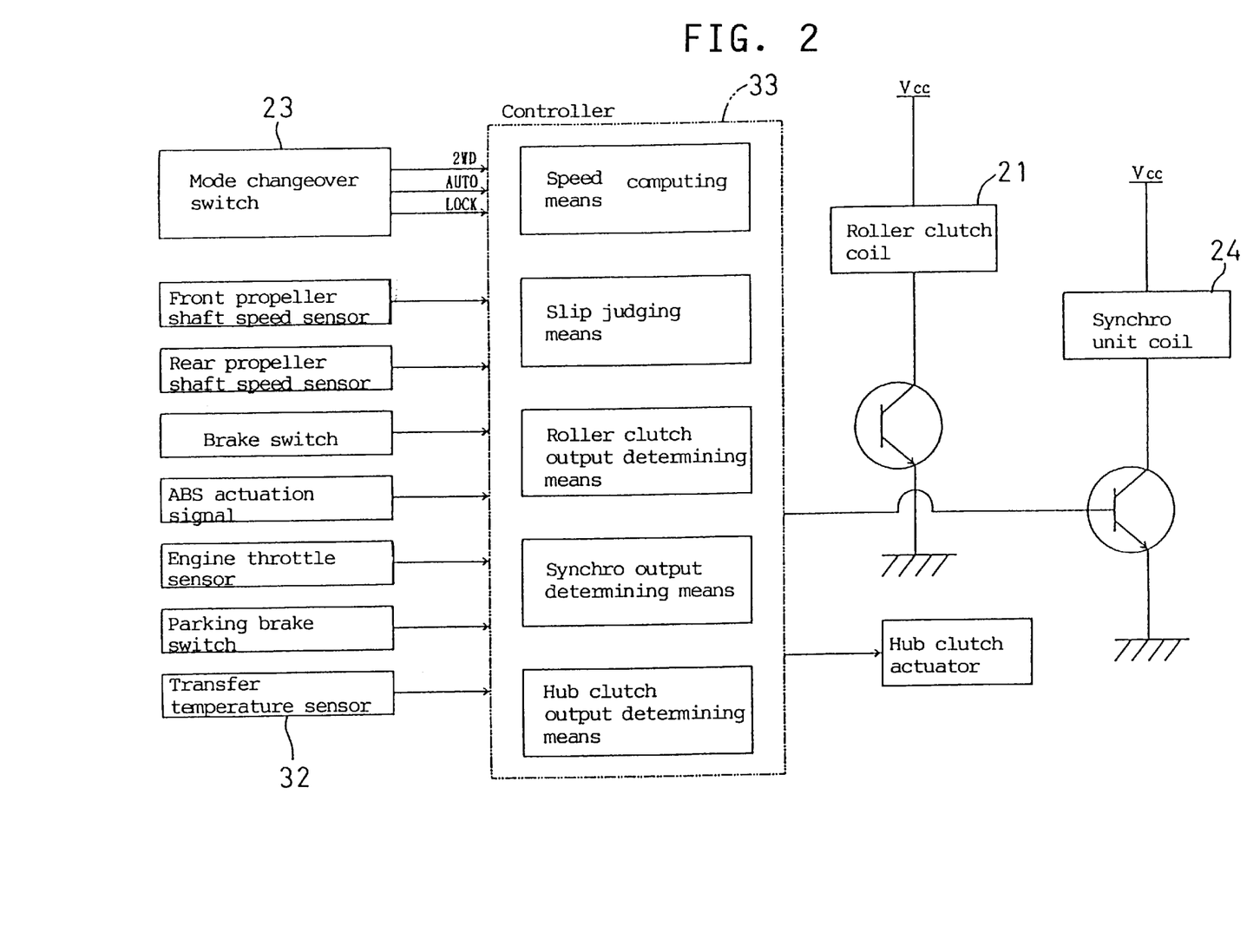
FIG. 2 is a block diagram of the control system.
Figure 3:
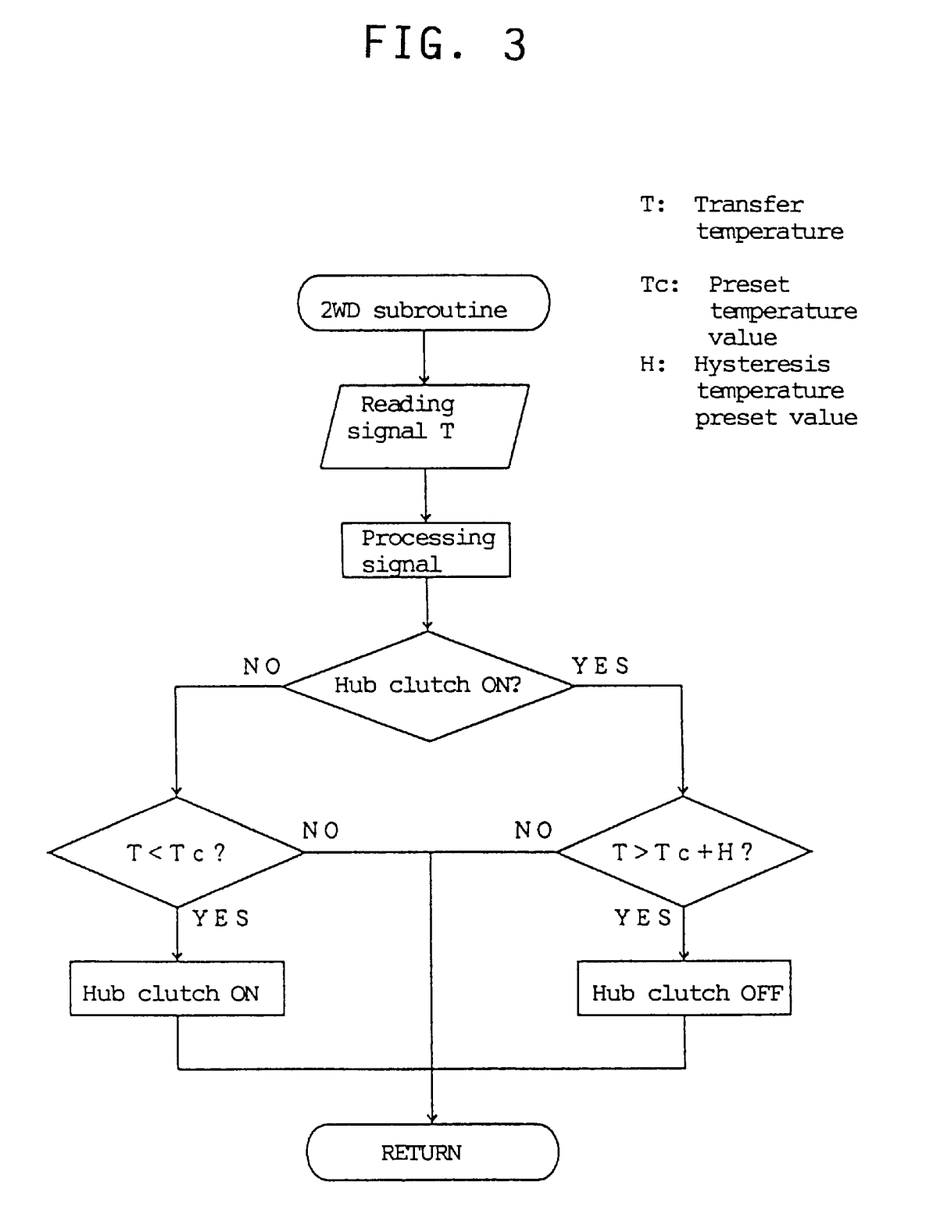
FIG. 3 is a flowchart showing the operation of the control system.

FIGS. 1–3 show a control system of the first embodiment, which comprises a rotation transmission device A mounted in a transfer 5, and a temperature sensor 32 mounted in the transfer 5 for measuring the temperature of lubricating oil 31 in the transfer.

The temperature sensor 32 transmits an oil temperature signal to an ECU (controller) 33. Based on the oil temperature signal, the ECU 33 controls an actuator for the hub clutches 2.

When the vehicle starts in a cold environment with the mode changeover switch 23 in the 2WD position, the oil temperature signal is transmitted from the temperature sensor 32 to the ECU 33. If the oil temperature detected by the sensor 32 is lower than a predetermined value, the ECU 33 will engage the hub clutches 2 or a front axle engaging/disengaging means.

With a conventional rotation transmission device A, its inner member 12 will rotate freely relative to the stationary outer ring 13 during the 2WD mode. According to the present invention, the clutches 2 or the front axle engaging/disengaging means are engaged in this state if the temperature of lubricating oil 31 is lower than the predetermined value. Thus, the rotation of the front wheels 1 is transmitted to the outer ring 13, so that the outer ring 13 is rotated in the same direction as the inner member 12. As a result, the speed difference between the inner member 12 and outer ring 13 diminishes sufficiently. This prevents the two-way clutch 10 from getting locked due to dragging resistance of the oil 31 even though the oil is cold and thus high in viscosity.

While the vehicle is traveling, the oil temperature in the transfer 5 rises with time. When the temperature sensor 32 detects that the oil temperature has exceeded the predetermined value, the hub clutches 2 or the front axle engaging/disengaging means are disengaged. The drive mode thus returns to the normal 2WD drive position with the front drive train at a stop (i.e. not driven).

While the temperature of lubricating oil 31 in the transfer 5 rises above the predetermined value, its viscosity is low and the dragging resistance decreases. Thus, in this state, even when the front drive train is stopped and as a result, the inner member 12 begins to rotate relative to the now stationary outer ring 13, the two-way clutch 10 will never lock. That is, the clutch 10 is kept unlocked, so that it produces no detrimental vibrations due to repeated locking and unlocking even at the start-up of the vehicle in a cold environment.

Figure 4:
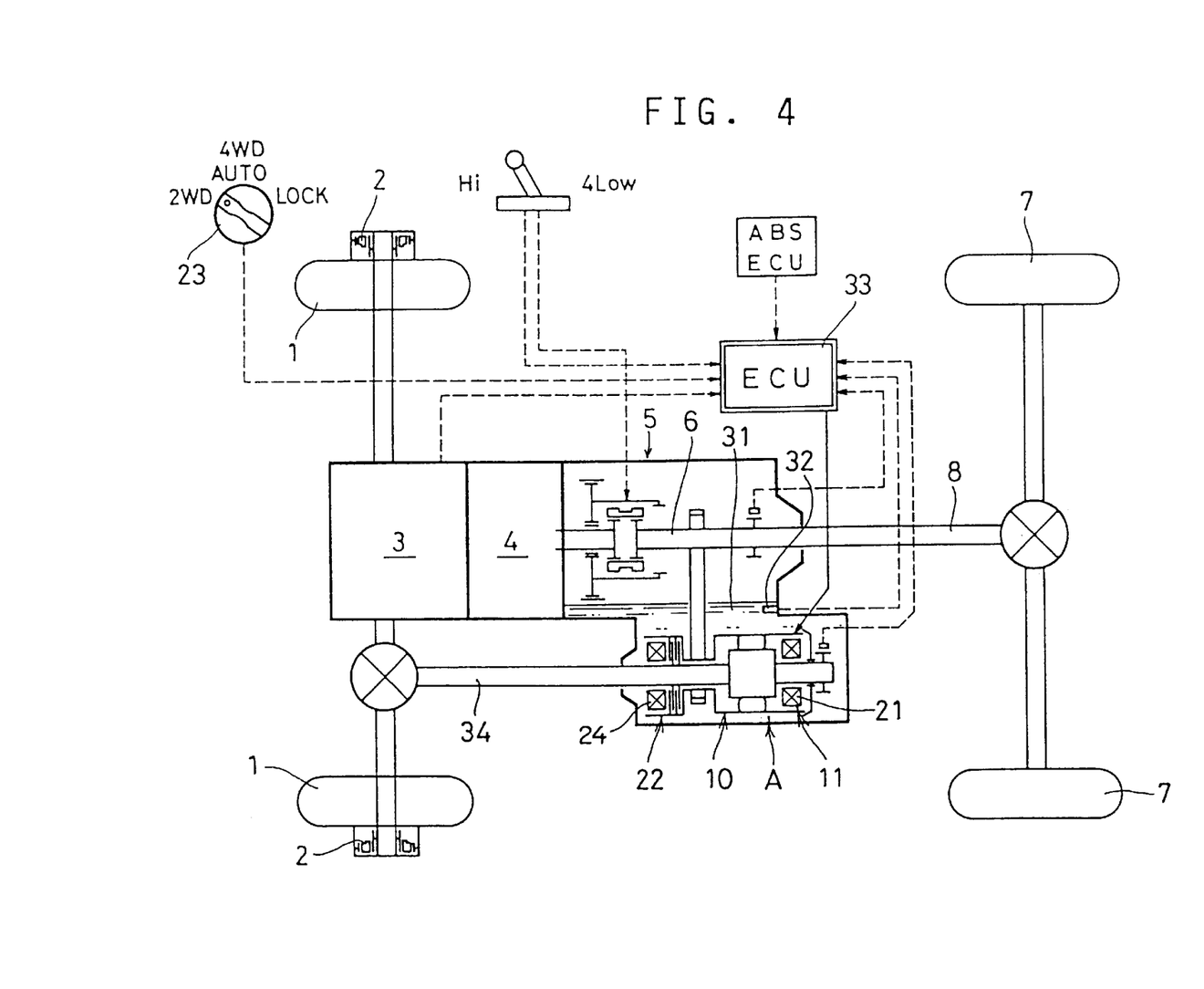
FIG. 4 is a plan view of the power train of a 4WD having a rotation transmission device mounted on a lower output shaft.

FIG. 4 is a control system of the second embodiment, in which a rotation transmission device A is mounted on a front output shaft 34 provided in the lower part of the transfer 5. A synchronizer 22, a two-way clutch 10 and an electromagnetic clutch 11 are immersed in lubricating oil 31. A temperature sensor 32 is attached to the transfer 5 to measure the temperature of lubricating oil 31.

In the second embodiment, when the vehicle is started in a cold environment with the mode changeover switch in the 2WD position, an oil temperature signal is transmitted from the temperature sensor 32 to the ECU 33. If the oil temperature is lower than a predetermined value, the ECU 33 activates an electromagnetic coil 21 as a current control means of the electromagnetic clutch 11 or an electromagnetic coil 24 of the synchronizer 22 (FIG. 2) to heat the oil 31 in the transfer 5, especially the portion of the oil in the two-way clutch 10, to thus reduce its viscosity. The dragging resistance produced by the oil 31 thus decreases, preventing the two-way clutch 10 from getting locked.

In the second embodiment, the voltage applied to the electromagnetic coil 21 during AUTO mode has to be limited to such a value that the friction produced between the friction flange 19 and the armature 20 when the electromagnetic coil 21 is activated will not exceed the torque of the switch spring 18 to prevent the two-way clutch 10 from getting locked.

In either of the embodiments, two oil temperature thresholds I and II (II>I) with hysteresis are stored in ECU 33. When the oil temperature measured by the temperature sensor 32 is lower than threshold I, the hub clutches 2 are engaged or the electromagnetic coils 21, 24 are activated, and when it exceeds threshold II, the hub clutches 2 are disengaged or the electromagnetic coils 21, 24 are deactivated.

In the first embodiment, the hub clutches 2 are engaged and disengaged, while in the second embodiment, the electromagnetic coils 21, 24 are activated and deactivated. Also, the control system may be designed such that the hub clutches 2 are controlled as in the first embodiment, while at the same time, the coils 21, 24 are controlled as in the second embodiment.

The control system according to this invention has an oil temperature sensor for measuring the temperature of oil in the transfer. If the oil temperature is lower than a predetermined value when the vehicle is started with the drive mode set at 2WD, the front drive train is rotated to reduce the idling speed of the two-way clutch of the rotation transmission device. It is thus possible to prevent the two-way clutch from getting locked even while large dragging resistance is produced by the lubricating oil because the oil is cold and high in viscosity. The two-way clutch is thus less likely to vibrate.

Alternatively, when the vehicle is started in a cold environment with the drive mode at 2WD or AUTO, the current control means of the rotation transmission device may be activated to heat the oil in the transfer. By heating the oil, its viscosity and the dragging resistance by the oil decreases. This prevents the two-way clutch from getting locked.

What is claimed is:

1. A method for controlling a 4WD vehicle comprising a rotation transmission device and in which the output of a transmission is directly delivered to a rear propeller shaft through an input shaft in a transfer, said rotation transmission device distributing the output of the transmission to a front propeller shaft, and a temperature sensor provided in said transfer for measuring the temperature of lubricating oil in said transfer, and hub clutches or an axle coupling/uncoupling mechanism mounted on a front drive train, the rotation transmission device comprising:

a two-way clutch comprising an inner member coupled to the input shaft, an outer ring rotatable mounted around the inner member and connected to the front drive train, and a plurality of engaging elements disposed between the outer ring and the inner member and movable between a first position in which the inner member and the outer ring cannot be locked together through the engaging elements, and a second position in which the inner member and the outer ring can be locked together, and a current control means for moving the engaging elements to the second position when activated, said method comprising:

engaging the hub clutches or the axle coupling/uncoupling mechanism, even when the current control means is not activated, when the temperature of lubricating oil detected by the temperature sensor is below a predetermined temperature, so as to cause rotation of the outer ring in the same direction as the inner member to thereby reduce a rotational speed difference between said outer ring and said inner member.

2. A method as claimed in claim 1, further comprising disengaging the hub clutches or the axle coupling/uncoupling mechanism when the temperature of lubricating oil detected by the temperature sensor has increased above a second predetermined temperature.

3. A method for controlling a 4WD vehicle comprising a rotation transmission device and in which the output of a transmission is directly delivered to a rear propeller shaft through an input shaft in a transfer, said rotation transmission device distributing the output of the transmission to a front propeller shaft, and a temperature sensor provided in said transfer for measuring the temperature of lubricating oil in said transfer, and hub clutches or an axle coupling/uncoupling mechanism:

said method comprising:
  engaging said hub clutches or said axle coupling/uncoupling mechanism when the temperature of lubricating oil detected by said temperature sensor is below a first predetermined temperature even during a 2WD mode; and
  disengaging said hub clutches or said axle coupling/uncoupling mechanism when the temperature of lubricating oil detected by said temperature sensor has increased above a second predetermined temperature, said second predetermined temperature being higher than said first predetermined temperature with a hysteresis existing between them.

4. A method for controlling a 4WD vehicle comprising a rotation transmission device and in which the output of a transmission is directly delivered to a rear propeller shaft through an input shaft in a transfer, said rotation transmission device distributing the output of the transmission to said front propeller shaft, and a temperature sensor provided in said transfer for measuring the temperature of lubricating oil in said transfer:

said method comprising activating an electromagnetic coil of said rotation transmission device to increase the temperature inside said rotation transmission device when the temperature of lubricating oil detected by said temperature sensor is below a predetermined temperature.

5. A four-wheel drive system comprising a rotation transmission device to be mounted in a transfer in an FR-based four-wheel drive vehicle, said rotation transmission device being capable of delivering output from a transmission to a rear propeller shaft of the four-wheel drive vehicle and distributing the output from the transmission to a front propeller shaft, said rotation transmission device comprising:

a two-way clutch including engaging elements;
  a current control means comprising an electromagnetic coil for selectively locking and unlocking said two-way clutch to change a vehicle drive mode between two-wheel and four-wheel drive modes; and
  a temperature sensor for detecting the temperature of lubricating oil in the transfer and, when a temperature below a predetermined value is detected, causing activation of said electromagnetic coil to increase the temperature inside the transfer device.

6. A four-wheel drive system as claimed in claim 5, further comprising hub clutches or an axle coupling/uncoupling mechanism to be mounted between the front propeller shaft and front wheels of the four-wheel drive vehicle for coupling and uncoupling the front propeller shaft to and from the front wheels.

* * * * *